(12) United States Patent
Tiirola et al.

(10) Patent No.: US 11,329,715 B2
(45) Date of Patent: May 10, 2022

(54) WIRELESS RELAY OPERATION ON TOP OF 5G FRAME STRUCTURE

(71) Applicant: NOKIA SOLUTIONS AND NETWORKS OY, Espoo (FI)

(72) Inventors: Esa Tapani Tiirola, Kempele (FI); Sami-Jukka Hakola, Kempele (FI); Kari Pekka Pajukoski, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/300,721

(22) PCT Filed: Mar. 1, 2017

(86) PCT No.: PCT/EP2017/054700
§ 371 (c)(1),
(2) Date: Nov. 13, 2018

(87) PCT Pub. No.: WO2017/194218
PCT Pub. Date: Nov. 16, 2017

(65) Prior Publication Data
US 2019/0165851 A1    May 30, 2019

(30) Foreign Application Priority Data
May 13, 2016    (GB) .................................. 1608641.5

(51) Int. Cl.
*H04B 7/14* (2006.01)
*H04B 7/155* (2006.01)
(Continued)

(52) U.S. Cl.
CPC ......... *H04B 7/15592* (2013.01); *H04B 7/155* (2013.01); *H04L 27/2607* (2013.01);
(Continued)

(58) Field of Classification Search
USPC ....... 370/229, 230, 236, 252, 279, 315, 328, 370/329, 330, 458, 492, 501
See application file for complete search history.

(56) References Cited

U.S. PATENT DOCUMENTS

| 10,637,630 | B2* | 4/2020 | Park .................... H04L 5/0035 |
| 2011/0103291 | A1* | 5/2011 | Wiberg ............. H04B 7/15542 370/315 |

(Continued)

FOREIGN PATENT DOCUMENTS

EP    2418784 A2    2/2012

OTHER PUBLICATIONS

3GPP TSG-RAN WG1 Meeting #84bis; R1-162893, "Basic Frame Structure Principles for 5G New Radio"; Nokia, Alcatel-Lucent Shanghai Bell; Apr. 11-15, 2016; Busan (Year: 2016).*

(Continued)

*Primary Examiner* — Nguyen H Ngo
(74) *Attorney, Agent, or Firm* — Brake Hughes Bellermann LLP

(57) ABSTRACT

There is provided a subframe arrangement for use in wireless communications between a relay node and a base station and between a user equipment and at least one of the base station and relay node, the subframe arrangement comprising a plurality of symbols and a downlink control portion comprising at least one symbol having a first portion allocatable to a first downlink control channel transmission, wherein the first downlink control channel transmission is from the base station to the relay node, an uplink control portion comprising at least one symbol having a first portion allocatable to a first uplink control channel transmission, wherein the first uplink control channel transmission is from the relay node to the base station, a data portion allocatable to one of one of uplink and downlink data transmission, wherein the data transmission is between the relay node and (Continued)

the base station, and wherein symbol timing of the subframe arrangement is different to the symbol timing of a subframe arrangement for use solely in wireless communications between a user equipment and at least one of the base station and a relay node.

19 Claims, 11 Drawing Sheets

(51) Int. Cl.
*H04W 72/04* (2009.01)
*H04W 84/04* (2009.01)
*H04L 27/26* (2006.01)

(52) U.S. Cl.
CPC ..... *H04L 27/2662* (2013.01); *H04W 72/0446* (2013.01); *H04W 84/047* (2013.01)

(56) References Cited

U.S. PATENT DOCUMENTS

| | | | |
|---|---|---|---|
| 2011/0268016 A1* | 11/2011 | Youn | H04W 74/006 370/315 |
| 2012/0002593 A1* | 1/2012 | Kim | H04L 1/1854 370/315 |
| 2012/0033603 A1* | 2/2012 | Seo | H04L 5/001 370/312 |
| 2012/0069793 A1* | 3/2012 | Chung | H04W 76/27 370/315 |
| 2012/0093065 A1* | 4/2012 | Golitschek Edler Von Elbwart | H04B 7/15542 370/315 |
| 2012/0099518 A1* | 4/2012 | Park | H04B 7/2606 370/315 |
| 2012/0113884 A1* | 5/2012 | Park | H04L 1/0003 370/312 |
| 2012/0218935 A1* | 8/2012 | Zhang | H04B 7/15542 370/315 |
| 2013/0010676 A1* | 1/2013 | Kim | H04B 7/155 370/315 |
| 2013/0058264 A1 | 3/2013 | Gan et al. | |
| 2013/0329686 A1* | 12/2013 | Kim | H04L 5/0053 370/329 |
| 2014/0133367 A1* | 5/2014 | Chen | H04W 72/042 370/279 |
| 2014/0254468 A1* | 9/2014 | Raaf | H04W 16/26 370/315 |
| 2015/0180622 A1* | 6/2015 | Yoo | H04L 5/0037 370/330 |
| 2017/0063514 A1* | 3/2017 | Chen | H04W 72/0406 |
| 2017/0257860 A1* | 9/2017 | Nam | H04W 72/0446 |

OTHER PUBLICATIONS

TSG-RAN WG1 Meeting #59-bis; R1-100640; "WF on Timing Alignment between Backhaul and Access Subframes", Valencia, Spain; Jan. 18-22, 2009; 2 pages.

Office Action for United Kingdom Patent Application No. GB1608641. 5, dated Jun. 4, 2021, 4 pages.

International Search Report and Written Opinion for International Application No. PCT/EP2017/054700, dated Jun. 22, 2017, 16 pages.

3GPP TSG-RAN WG1 Meeting #84bis; R1-162893, "Basic Frame Structure Principles for 5G New Radio"; Nokia, Alcatel-Lucent Shanghai Bell; Apr. 11-15, 2016; Busan, Korea; 7 pages.

3GPP TSG-RAN WG1 Meeting #85; R1-165031, "On the Wireless Relay Operation in Nr" Nokia, Alcatel-Lucent Shanghai Bell; May 23-27, 2016; Nanjing, P.R. China; 6 pages.

* cited by examiner

⟵——— UL, Access
⟵- - - - - UL, Backhaul
————⟶ DL, Access
- - - - -⟶ DL, Backhaul

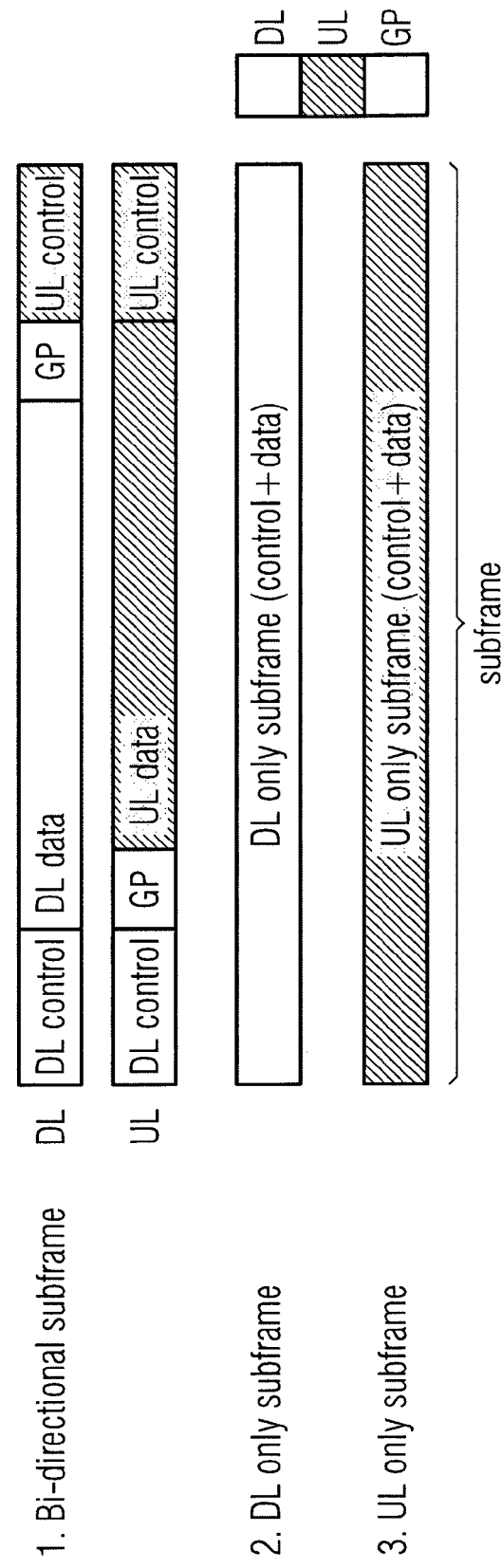

FIG 7

| Data subframe configuration* | OFDMA symbol index | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | Dc | Dd | Dd | Dd | Dd | Dd | Dd | Dd | Dd | Dd | Dd | Dd | Dd | Dd |
| 1 | Dc | Dd | Dd | Dd | Dd | Dd | Dd | Dd | Dd | Dd | Dd | Dd | GP | Uc |
| 2 | Dc | Dd | Dd | Dd | Dd | Dd | Dd | Dd | Dd | Dd | Dd | GP | Uc | Uc |
| 3 | Dc | Dc | Dd | Dd | Dd | Dd | Dd | Dd | Dd | Dd | Dd | Dd | Dd | Dd |
| 4 | Dc | Dc | Dd | Dd | Dd | Dd | Dd | Dd | Dd | Dd | Dd | Dd | GP | Uc |
| 5 | Dc | Dc | Ud | Ud | Ud | Ud | Ud | Ud | Ud | Ud | Ud | GP | Uc | Uc |
| 6 | Dc | GP | Ud | Ud | Ud | Ud | Ud | Ud | Ud | Ud | Ud | Ud | Ud | Uc |
| 7 | Dc | GP | Ud | Ud | Ud | Ud | Ud | Ud | Ud | Ud | Ud | Ud | Ud | Ud |
| 8 | Dc | GP | Ud | Ud | Ud | Ud | Ud | Ud | Ud | Ud | Ud | Ud | Uc | Uc |
| 9 | Ud | Ud | Ud | Ud | Ud | Ud | Ud | Ud | Ud | Ud | Ud | Ud | Ud | Uc |
| 10 | Ud | Ud | Ud | Ud | Ud | Ud | Ud | Ud | Ud | Ud | Ud | Ud | Ud | Uc |
| 11 | Ud | Ud | Ud | Ud | Ud | Ud | Ud | Ud | Ud | Ud | Ud | Ud | Uc | Uc |

Allocating resources for use by a subframe arrangement, the arrangement comprising a plurality of symbols and a downlink control portion comprising at least one symbol having a first portion allocatable to a first downlink control channel transmission, wherein the first downlink control channel transmission is from the base station to the relay node, an uplink control portion comprising at least one symbol having a first portion allocatable to a first uplink control channel transmission, wherein the first uplink control channel transmission is from the relay node to the base station, and a data portion allocatable to one of one of uplink and downlink data transmission, wherein the data transmission is between the relay node and the base station, wherein symbol timing of the subframe arrangement is different to the symbol timing of a subframe arrangement for use solely in wireless communications between a user equipment and at least one of the base station and a relay node.

WIRELESS RELAY OPERATION ON TOP OF 5G FRAME STRUCTURE

CROSS-REFERENCE TO RELATED APPLICATIONS

This application is a national stage entry of PCT Application No. PCT/EP2017/054700 filed Mar. 1, 2017, entitled "WIRELESS RELAY OPERATION ON TOP OF 5G FRAME STRUCTURE" which claims the benefit of priority of GB 1608641.5 filed May 13, 2016, both of which are hereby incorporated by reference in their entireties.

FIELD

The present application relates to a method, apparatus, system and computer program and in particular but not exclusively to a method and apparatus for a self-backhauling arrangement for 5G New Radio.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data, machine type communications (MTC), and so on. Non-limiting examples of services provided comprise two-way or multi-way calls, data communication or multimedia services and access to a data network system, such as the Internet.

In a wireless communication system at least a part of a communication session between at least two stations occurs over a wireless link.

Wireless communication devices can be of different types. Wireless communication devices may or may not need human interaction. A wireless communication device of a user is often referred to as user equipment (UE). A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Another example is the long-term evolution (LTE) of the Universal Mobile Telecommunications System (UMTS) radio-access technology. LTE is being standardized by the 3rd Generation Partnership Project (3GPP). A further example is so-called 5G or New Radio (the term used by 3GPP) networks. Standardization of 5G or New Radio networks is currently under discussion.

SUMMARY

In a first aspect, there is provided a subframe arrangement for use in wireless communications between a relay node and a base station and between a user equipment and at least one of the base station and relay node, the subframe arrangement comprising a plurality of symbols and a downlink control portion comprising at least one symbol and having a first portion allocatable to a first downlink control channel transmission, wherein the first downlink control channel transmission is from the base station to the relay node, an uplink control portion comprising at least one symbol having a first portion allocatable to a first uplink control channel transmission, wherein the first uplink control channel transmission is from the relay node to the base station, a data portion allocatable to one of one of uplink and downlink data transmission, wherein the data transmission is between the relay node and the base station, and wherein symbol timing of the subframe arrangement is different to the symbol timing of a subframe arrangement for use solely in wireless communications between a user equipment and at least one of the base station and a relay node.

The uplink control portion may comprise a second portion allocatable to a second uplink control channel transmission, wherein the second uplink control channel transmission is from the user equipment to one of the relay node and the base station.

The arrangement may comprise a guard period between the first and second portions of the uplink control portion, such that the symbol timing of the subframe arrangement is different to the symbol timing of a subframe arrangement for use solely in wireless communications between a user equipment and at least one of the base station and a relay node.

The downlink control portion may comprise a second portion allocatable to a second downlink control channel transmission, wherein the second downlink control channel transmission is from one of the relay node and the base station to the user equipment.

The arrangement may comprise a guard period between the first and second portions of the downlink control portion, such that the symbol timing of the subframe arrangement is different to the symbol timing of a subframe arrangement for use solely in wireless communications between a user equipment and at least one of the base station and a relay node.

When the data portion comprises an uplink data portion there is a guard portion between the downlink control portion and the data portion and no guard period between the uplink control portion and the data portion and when the data portion comprises a downlink data portion, there is a guard period between the uplink control portion and the data portion and no guard period between the downlink control portion and the data portion.

The second portion of the downlink control portion may have a predefined size.

The second portion of the downlink control portion may comprise 1 symbol.

The subframe type may be determined from a physical downlink control channel.

Downlink control information may comprise an indication of subframe type for the relay node.

Downlink control information may comprise an indication of subframe type for the user equipment.

The subframe arrangement length may be equal to the length of the subframe arrangement for use solely in wireless communications between a user equipment and at least one of the base station and a relay node.

In a second aspect, there is provided a method comprising allocating resources for use by a subframe arrangement, the arrangement comprising a plurality of symbols and a downlink control portion comprising at least one symbol having a first portion allocatable to a first downlink control channel transmission, wherein the first downlink control channel transmission is from the base station to the relay node, an uplink control portion comprising at least one symbol having a first portion allocatable to a first uplink control channel transmission, wherein the first uplink control channel transmission is from the relay node to the base station, a data portion allocatable to one of one of uplink and downlink data transmission, wherein the data transmission is between the relay node and the base station, and wherein symbol timing of the subframe arrangement is different to the symbol timing of a subframe arrangement for use solely in wireless communications between a user equipment and at least one of the base station and a relay node.

The uplink control portion may comprise a second portion allocatable to a second uplink control channel transmission, wherein the second uplink control channel transmission is from the user equipment to one of the relay node and the base station.

The arrangement may comprise a guard period between the first and second portions of the uplink control portion, such that the symbol timing of the subframe arrangement is different to the symbol timing of a subframe arrangement for use solely in wireless communications between a user equipment and at least one of the base station and a relay node.

The downlink control portion may comprise a second portion allocatable to a second downlink control channel transmission, wherein the second downlink control channel transmission is from one of the relay node and the base station to the user equipment.

The arrangement may comprise a guard period between the first and second portions of the uplink control portion, such that the symbol timing of the subframe arrangement is different to the symbol timing of a subframe arrangement for use solely in wireless communications between a user equipment and at least one of the base station and a relay node.

When the data portion comprises an uplink data portion there may be a guard portion between the downlink control portion and the data portion and no guard period between the uplink control portion and the data portion. When the data portion comprises a downlink data portion, there may be a guard period between the uplink control portion and the data portion and no guard period between the downlink control portion and the data portion.

The method may comprise allocating the subframe semi-statically, dynamically or both semi-statically and dynamically.

The subframe type may be determined from a physical downlink control channel.

Downlink control information may comprise an indication of subframe type for the relay node.

Downlink control information may comprise an indication of subframe type for the user equipment.

The subframe arrangement length may be equal to the length of the subframe arrangement for use solely in wireless communications between a user equipment and at least one of the base station and a relay node.

One set of the subframe arrangements may be allocated with a predefined pattern. One or more additional subframe arrangements is by the subframe arrangements allocated with the predetermined pattern.

The second portion of the downlink control portion may have a predefined size.

The second portion of the downlink control portion may comprise 1 symbol.

In a third aspect, there is provided an apparatus comprising means for allocating resources for use by a subframe arrangement, the arrangement comprising a plurality of symbols and a downlink control portion comprising at least one symbol having a first portion allocatable to a first downlink control channel transmission, wherein the first downlink control channel transmission is from the base station to the relay node, an uplink control portion comprising at least one symbol having a first portion allocatable to a first uplink control channel transmission, wherein the first uplink control channel transmission is from the relay node to the base station, a data portion allocatable to one of one of uplink and downlink data transmission, wherein the data transmission is between the relay node and the base station, and wherein symbol timing of the subframe arrangement is different to the symbol timing of a subframe arrangement for use solely in wireless communications between a user equipment and at least one of the base station and a relay node.

The uplink control portion may comprise a second portion allocatable to a second uplink control channel transmission, wherein the second uplink control channel transmission is from the user equipment to one of the relay node and the base station.

The arrangement may comprise a guard period between the first and second portions of the uplink control portion, such that the symbol timing of the subframe arrangement is different to the symbol timing of a subframe arrangement for use solely in wireless communications between a user equipment and at least one of the base station and a relay node.

The downlink control portion may comprise a second portion allocatable to a second downlink control channel transmission, wherein the second downlink control channel transmission is from one of the relay node and the base station to the user equipment.

The arrangement may comprise a guard period between the first and second portions of the uplink control portion, such that the symbol timing of the subframe arrangement is different to the symbol timing of a subframe arrangement for use solely in wireless communications between a user equipment and at least one of the base station and a relay node.

When the data portion comprises an uplink data portion there may be a guard portion between the downlink control portion and the data portion and no guard period between the uplink control portion and the data portion. When the data portion comprises a downlink data portion, there may be a guard period between the uplink control portion and the data portion and no guard period between the downlink control portion and the data portion.

The apparatus may comprise means for allocating the subframe semi-statically, dynamically or both semi-statically and dynamically.

The subframe type may be determined from a physical downlink control channel.

Downlink control information may comprise an indication of subframe type for the relay node.

Downlink control information may comprise an indication of subframe type for the user equipment.

The subframe arrangement length may be equal to the length of the subframe arrangement for use solely in wireless communications between a user equipment and at least one of the base station and a relay node.

One set of the subframe arrangements may be allocated with a predefined pattern. One or more additional subframe arrangements is by the subframe arrangements allocated with the predetermined pattern.

The second portion of the downlink control portion may have a predefined size.

The second portion of the downlink control portion may comprise 1 symbol.

In a fourth aspect there is provided an apparatus, said apparatus configured to at least one processor and at least one memory including a computer program code, the at least one memory and the computer program code configured to, with the at least one processor, cause the apparatus at least to allocate resources for use by a subframe arrangement, the arrangement comprising a plurality of symbols and a downlink control portion comprising at least one symbol having a first portion allocatable to a first downlink control channel transmission, wherein the first downlink control channel transmission is from the base station to the relay node, an uplink control portion comprising at least one symbol having a first portion allocatable to a first uplink control channel transmission, wherein the first uplink control channel transmission is from the relay node to the base station, a data portion allocatable to one of one of uplink and downlink data transmission, wherein the data transmission is between the relay node and the base station, and wherein symbol timing of the subframe arrangement is different to the symbol timing of a subframe arrangement for use solely in wireless communications between a user equipment and at least one of the base station and a relay node.

The uplink control portion may comprise a second portion allocatable to a second uplink control channel transmission, wherein the second uplink control channel transmission is from the user equipment to one of the relay node and the base station.

The arrangement may comprise a guard period between the first and second portions of the uplink control portion, such that the symbol timing of the subframe arrangement is different to the symbol timing of a subframe arrangement for use solely in wireless communications between a user equipment and at least one of the base station and a relay node.

The downlink control portion may comprise a second portion allocatable to a second downlink control channel transmission, wherein the second downlink control channel transmission is from one of the relay node and the base station to the user equipment.

The arrangement may comprise a guard period between the first and second portions of the uplink control portion, such that the symbol timing of the subframe arrangement is different to the symbol timing of a subframe arrangement for use solely in wireless communications between a user equipment and at least one of the base station and a relay node.

When the data portion comprises an uplink data portion there may be a guard portion between the downlink control portion and the data portion and no guard period between the uplink control portion and the data portion. When the data portion comprises a downlink data portion, there may be a guard period between the uplink control portion and the data portion and no guard period between the downlink control portion and the data portion.

The apparatus may be configured to allocate the subframe semi-statically, dynamically or both semi-statically and dynamically.

The subframe type may be determined from a physical downlink control channel.

Downlink control information may comprise an indication of subframe type for the relay node.

Downlink control information may comprise an indication of subframe type for the user equipment.

The subframe arrangement length may be equal to the length of the subframe arrangement for use solely in wireless communications between a user equipment and at least one of the base station and a relay node.

One set of the subframe arrangements may be allocated with a predefined pattern. One or more additional subframe arrangements is by the subframe arrangements allocated with the predetermined pattern.

The second portion of the downlink control portion may have a predefined size.

The second portion of the downlink control portion may comprise 1 symbol.

In a fifth aspect there is provided a computer program embodied on a non-transitory computer-readable storage medium, the computer program comprising program code for controlling a process to execute a process, the process comprising allocating resources for use by a subframe arrangement, the arrangement comprising a plurality of symbols and a downlink control portion comprising at least one symbol having a first portion allocatable to a first downlink control channel transmission, wherein the first downlink control channel transmission is from the base station to the relay node, an uplink control portion comprising at least one symbol having a first portion allocatable to a first uplink control channel transmission, wherein the first uplink control channel transmission is from the relay node to the base station, a data portion allocatable to one of one of uplink and downlink data transmission, wherein the data transmission is between the relay node and the base station, and wherein symbol timing of the subframe arrangement is different to the symbol timing of a subframe arrangement for use solely in wireless communications between a user equipment and at least one of the base station and a relay node.

The uplink control portion may comprise a second portion allocatable to a second uplink control channel transmission, wherein the second uplink control channel transmission is from the user equipment to one of the relay node and the base station.

The arrangement may comprise a guard period between the first and second portions of the uplink control portion, such that the symbol timing of the subframe arrangement is different to the symbol timing of a subframe arrangement for use solely in wireless communications between a user equipment and at least one of the base station and a relay node.

The downlink control portion may comprise a second portion allocatable to a second downlink control channel transmission, wherein the second downlink control channel transmission is from one of the relay node and the base station to the user equipment.

The arrangement may comprise a guard period between the first and second portions of the uplink control portion, such that the symbol timing of the subframe arrangement is different to the symbol timing of a subframe arrangement for use solely in wireless communications between a user equipment and at least one of the base station and a relay node.

When the data portion comprises an uplink data portion there may be a guard portion between the downlink control portion and the data portion and no guard period between the uplink control portion and the data portion. When the data portion comprises a downlink data portion, there may be a guard period between the uplink control portion and the data portion and no guard period between the downlink control portion and the data portion.

The process may comprise allocating the subframe semi-statically, dynamically or both semi-statically and dynamically.

The subframe type may be determined from a physical downlink control channel.

Downlink control information may comprise an indication of subframe type for the relay node.

Downlink control information may comprise an indication of subframe type for the user equipment.

The subframe arrangement length may be equal to the length of the subframe arrangement for use solely in wireless communications between a user equipment and at least one of the base station and a relay node.

One set of the subframe arrangements may be allocated with a predefined pattern. One or more additional subframe arrangements is by the subframe arrangements allocated with the predetermined pattern.

The second portion of the downlink control portion may have a predefined size.

The second portion of the downlink control portion may comprise 1 symbol.

In an aspect there is provided a computer program product for a computer, comprising software code portions for performing the steps the method of the first and second aspect when said product is run on the computer.

A device for a communication system may comprise the apparatus according to the above aspects.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 6 shows a schematic diagram of a bi-directional subframe, a downlink only subframe and an uplink only subframe;

FIG. 7 shows subframe formats for exemplary pre-5G scenarios;

FIG. 9 shows subframe formats for use in LTE Release 10 TDD inband relaying;

FIG. 10 shows a flowchart of an example method according to some embodiments;

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
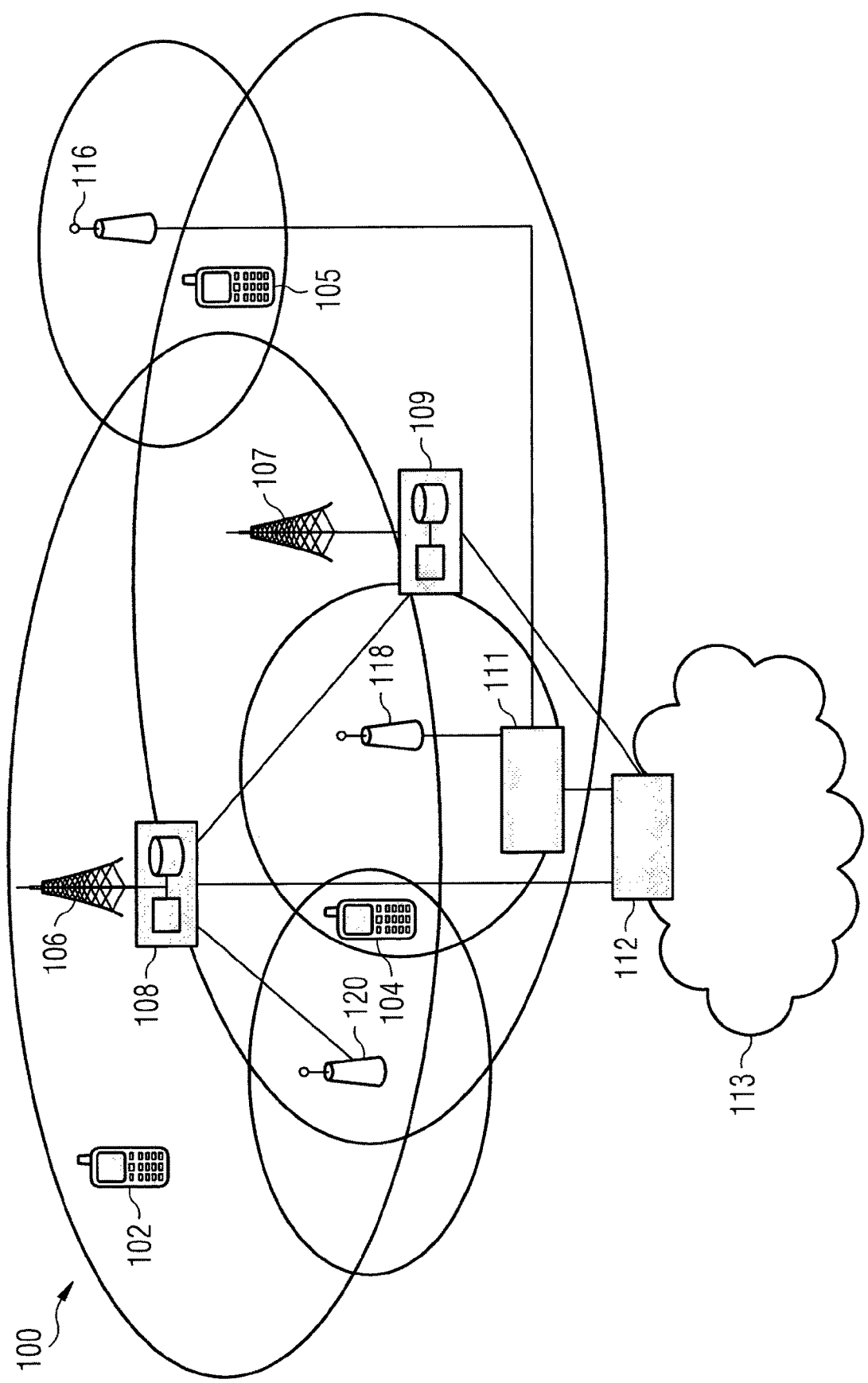
FIG. 1 shows a schematic diagram of an example communication system comprising a plurality of base stations and a plurality of communication devices.

In a wireless communication system 100, such as that shown in FIG. 1, a wireless communication devices, for example, user equipment (UE) or MTC devices 102, 104, 105 are provided wireless access via at least one base station or similar wireless transmitting and/or receiving wireless infrastructure node or point. Such a node can be, for example, a base station or an eNodeB (eNB) as in LTE or an access point (AP) in WLAN, or other wireless infrastructure node. These nodes will be generally referred to as base stations. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller. Other examples of radio access system comprise those provided by base stations of systems that are based on technologies such as 5G or new radio, wireless local area network (WLAN) and/or WiMax (Worldwide Interoperability for Microwave Access). A base station can provide coverage for an entire cell or similar radio service area.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

Figure 2:
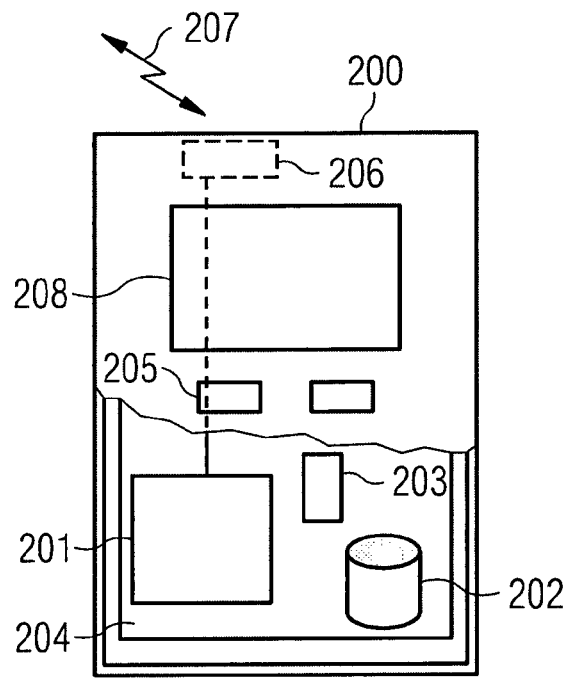
FIG. 2 shows a schematic diagram of an example mobile communication device.

A possible wireless communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE, user device or "user" are used to refer to any type of wireless communication device.

The wireless device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the wireless device.

A wireless device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the wireless device by means of a suitable user interface such as key pad 205, voice commands, touch sensitive screen or pad, combinations thereof or the like. A display 208, a speaker and a microphone can be also provided. Furthermore, a wireless communication device may comprise appropriate connectors (either wired or wireless) to other devices and/or for connecting external accessories, for example hands-free equipment, thereto. The communication devices 102, 104, 105 may access the communication system based on various access techniques.

The following relates to 5G physical layer design. More specifically, the following focuses on wireless relay operation (such as self-backhauling) on top of 5G (a.k.a New Radio) frame structure. A TDD system may have an inbuilt support for wireless relay operation. It would be desirable that radio resources may be allocated between Backhaul and Access link, as well as between UL and DL in a flexible manner while minimizing both access and backhaul link latencies.

New Radio frame structures may support backhaul/relay link (among other features). A 5G study item to identify and develop technology components needed for new radio (NR) systems, being able to use any spectrum band ranging at least up to 100 GHz, aims to achieve a single technical framework addressing usage scenarios, requirements and deployment scenarios. The new radio access technology (RAT) may be inherently forward compatible to allow specification in two separate phases of for specification (Phase I and Phase II). The study item also contains some technical features for the NR system to meet these objectives. Those include:

Tight interworking between the new RAT and LTE
Interworking with non-3GPP systems
Operation in licensed bands (paired and unpaired), and licensed assisted operations in unlicensed bands.
Stand-alone operation in licensed bands.
The new RAT should support also wireless relay functionality.

Figure 3:
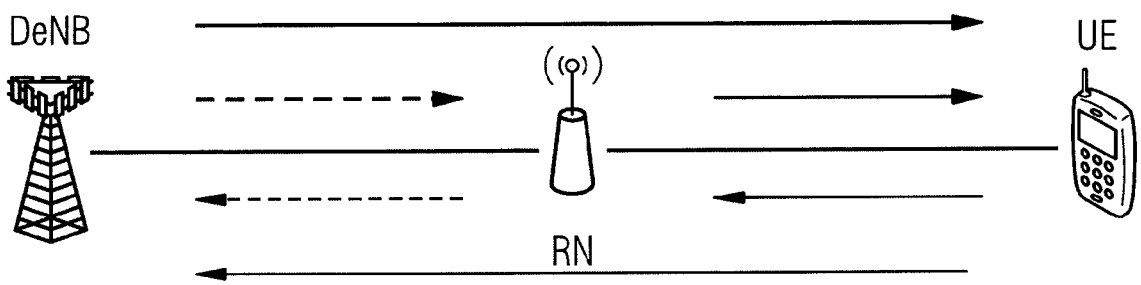
FIG. 3 shows a schematic diagram of an example communication system comprising a donor eNB, a relay node and a user equipment

FIG. 3 illustrates the links existing in a wireless relay scenario with one Donor eNB (DeNB), one relay node (RN) and one UE. The relay node may be a UE (for a UE relay system). In the case the RN is a UE, the RN, UE link would be a device-to-device link. The links include an access link between the eNB and UE, or between the RN and UE. A scenario with RN(s) contains, in addition to the access links, a backhaul link, which is the link between eNB and RN. Both access and backhaul links comprise two link directions, downlink and uplink. FIG. 3 illustrates the scenario with a single hop. The invention can be extended to cover also scenarios with multi-hop relaying (covering also a UE relay system).

Generally speaking, there are four different duplexing combinations for relay operation:

1. FDD, Outband relay: separate carriers for UL/DL and Access/BH (Backhaul)

2. FDD, Inband relay: separate carriers for UL/DL. The same carrier handles Access/BH.

3. TDD, Outband relay: separate carriers for Access/BH. The same carrier handles
UL/DL.

4. TDD, Inband relay: one carriers handles both UL/DL & Access/BH.

Figure 4:
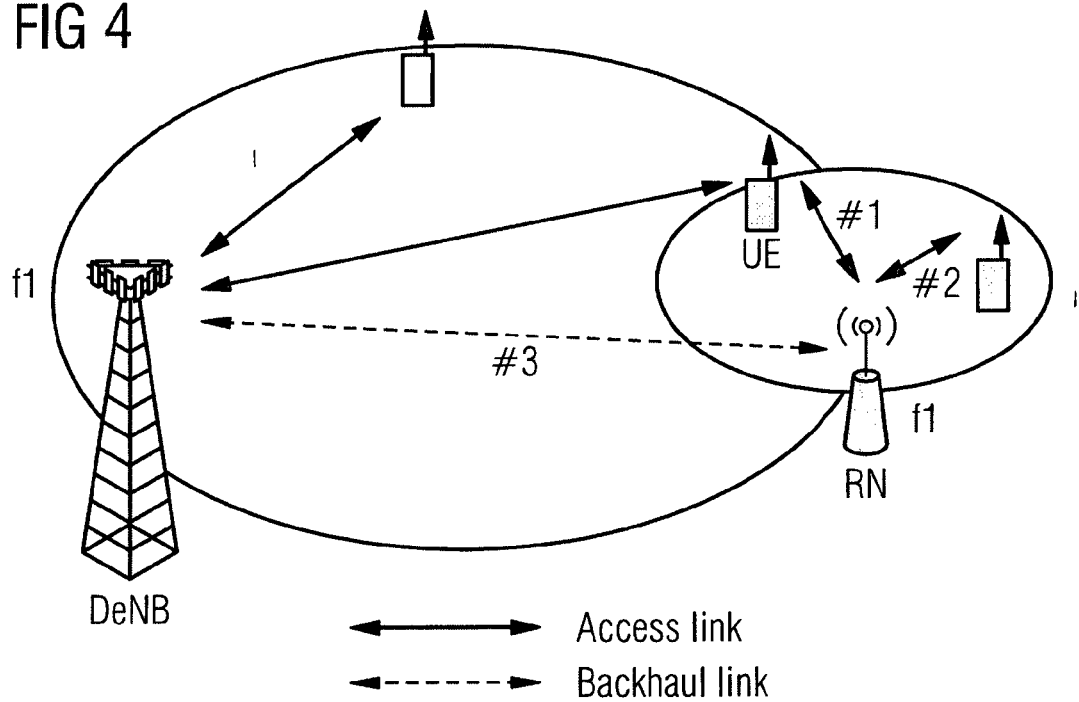
FIG. 4 shows a schematic diagram of an example communication system comprising a donor eNB, a relay node operating using time division duplexed inband relay and a user equipment.

In the following the fourth option, TDD in-band relay, which is referred to as self-backhaul is considered. FIG. 4 shows a scenario with a DeNB and a RN. In the scenario shown in FIG. 4, synchronized network and half-duplex technology (in which a node cannot transmit and receive simultaneously on the same band) is assumed. The wireless relay operation uses band $f_1$. The UE connected to RN should be able to connect also to the DeNB (this is a generic assumption behind relay operation). In this scenario, access links (#1 and #2) and backhaul link #3 cannot be run simultaneously since in this case both UE and RN are either transmitting or receiving.

Figure 5:
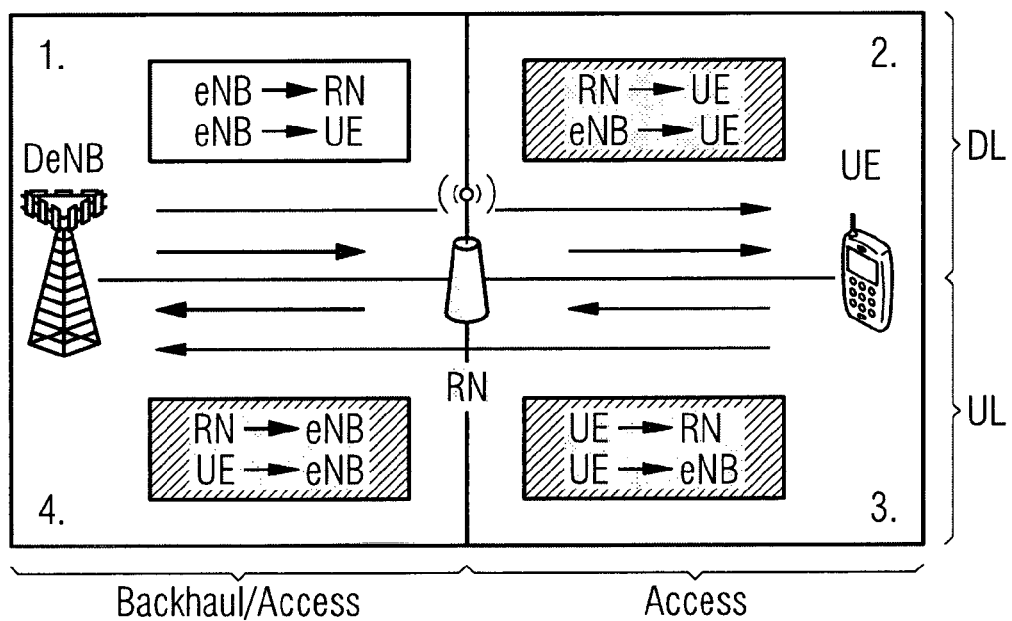
FIG. 5 shows a schematic diagram of a multiplexing solution between access and backhaul links.

One option may be to introduce four separate links, BH DL, BH UL, Access DL and Access UL, to support the scenario. An example of the four links is shown in FIG. 5. These links (BH DL, BH UL, Access DL, Access UL) operate in time division multiplexing with respect to each other.

5G TDD subframe format design may be based on a bi-directional subframe. FIG. 6 shows bi-directional, DL only and UL only subframe formats. Bi-directional subframes comprise a DL control part, an UL control part and either a DL data or UL data part. A guard period (GP) exists between the DL and UL portions of the subframe. Bi-directional subframes may provide link direction switching between DL and UL, fully flexible traffic adaptation between UL and DL and/or the opportunity for low latency, provided that subframe length is selected to be short enough.

In addition to bi-directional subframes, FIG. 6 shows an example of DL only and UL only subframe formats. These may be used, at least in FDD mode, but also in certain TDD scenarios to allow longer transmission periods in one direction. In order to support smooth coverage extension for an UE, it should be possible to extend the transmission of data and control channels over multiple subframes. Furthermore, in some scenarios, it may be possible to support TTI lengths shorter than a subframe.

Different access link subframe formats may be defined for exemplary pre-5G scenarios and example subframe formats are shown in FIG. 7.

Generally speaking, wireless relay operation contains specific requirements for the frame structure design. Latency may cause a bottleneck with relaying since, compared with access link operation, data conveyed via RN experiences at least one additional hop via the air interface.

There is a need for a wireless relay solution inbuilt/integrated in the NR design. The requirements of the preferred solution include at least one of the following:
  Support for dynamic and fully flexible radio resource allocation between Backhaul and Access link, as well as between UL and DL.
  Support for similar control/data/RS structures between Backhaul and Access link, as well as between UL and DL.
  Support for low latency. Relates enablers are
    Short subframe length
    Fast control plane/scheduling cycles
    Support for frequent link direction switching
    Dynamic point selection and fast data (re)routing
  Support for very high spectral efficiency in the backhaul link. This may require e.g. higher modulation order compared to that of access link.
  Support for good coverage in the backhaul link
  Support for multi-connectivity for reliability and capacity enhancement
  Support for RF beamforming in the backhaul link
  Optimized performance in a single hop scenario
  Sufficient scalability towards various multi-hop scenarios.

In order to support low latency operation in the scenarios involving wireless relays, partitioning of the access link resources and backhaul link resources need to be supported, not only between subframes, but also within a subframe.

It is desirable to facilitate dynamic and fully flexible radio resource allocation between Backhaul and Access link, as well as between UL and DL.

Figure 8:
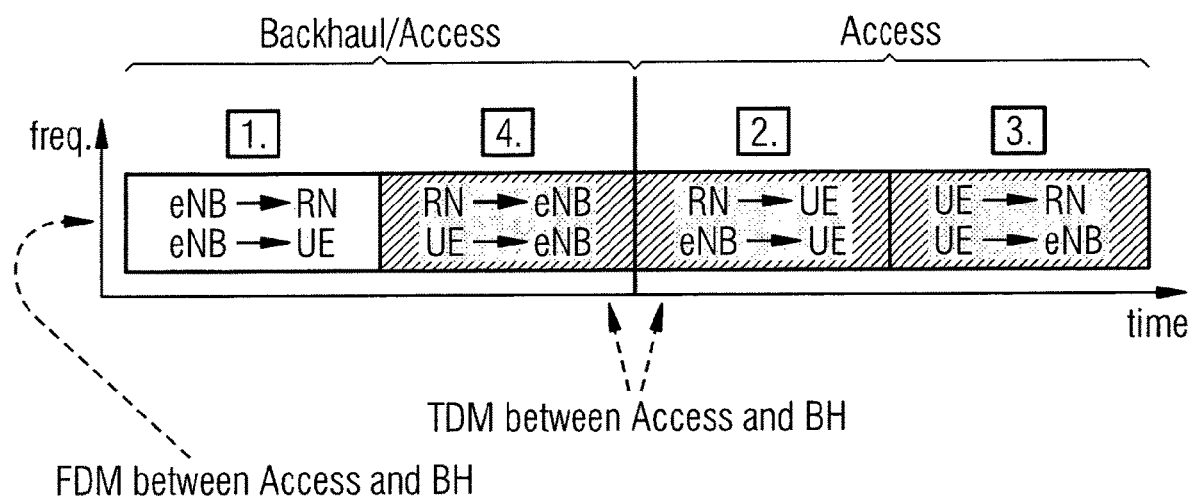
FIG. 8 shows a schematic diagram of an example time dimensional multiplexing between access and backhaul links.

It may also be desirable to avoid the so-called "Chicken-and-Egg problem" related to simultaneous (FDM) usage between access link and BH link (phases 1 and 4 in FIG. 8). The problems related to simultaneous FDM usage between access link and BH link may be as follows: it may be mandatory to facilitate additional switching time for RN, while keeping backhaul and access link traffic time aligned within the subframe. Further, to detect PDCCH from the BH subframe (or any signal transmitted in the DL control part), UE must know that the detected subframe is a BH subframe. Furthermore, "predictive scheduling operation", i.e. introduction of additional scheduling delay due to simultaneous BH operation should be avoided whenever possible.

An LTE solution for self-backhauling was developed in LTE Rel-10. Backwards compatibility is provided by means of a MBSFN (Multicast Broadcast Single Frequency Network) subframe (MBSFN functionality was introduced already in Rel-8). DL subframes of the BH link are configured as MBSFN subframes on the RN access link.

Figure 9:
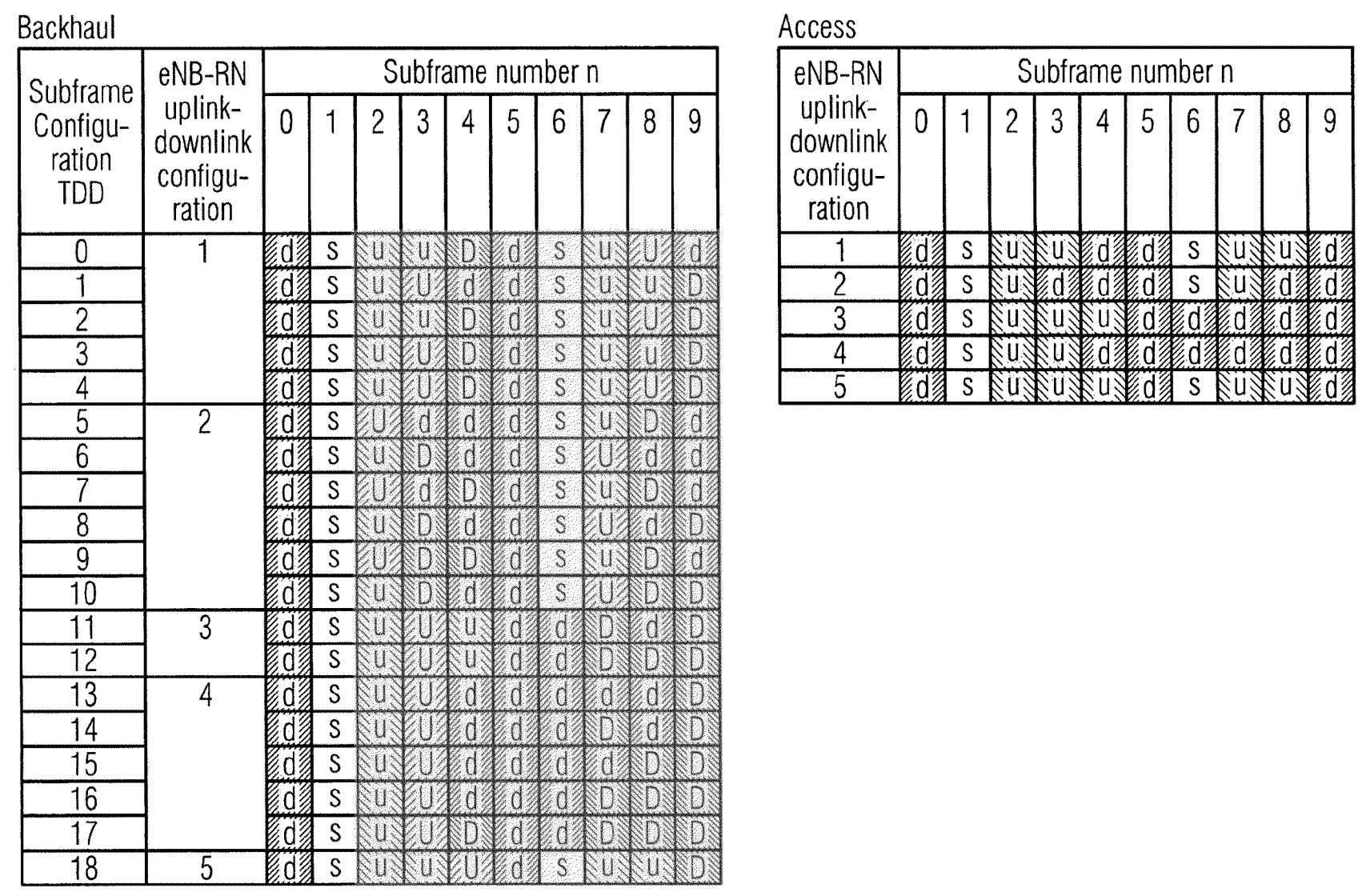

In LTE, the RN operates according to predefined "Subframe configuration pattern", an example of which is shown in FIG. 9. The pattern defines a ratio between access and backhaul as well as a UL/DL ratio in the Backhaul link. The pattern is semi-statically configured in each cell with RN. BH usage in LTE may be limited to these subframes only.

Special subframe formats have been defined in LTE for UL/DL. BH link applies shortened DL/UL subframes to provide sufficient time for UL/DL switching.

The Rel-10 solution may involve semi-static switching between access and BH, limited scalability, reduced peak data rate (for both access and BH), due to semi static switching, large overhead when traffic profile changes and/or an undesirable latency performance.

In 5G, the goal is to make fully scalable design, where support for self-backhauling is inbuilt in the basic 5G (access link) operation.

FIG. 10 shows a flowchart of an example method of providing support for self-backhauling. The method comprises allocating resources for use by a subframe arrangement, the arrangement comprising a plurality of symbols and a downlink control portion comprising at least one symbol having a first portion allocatable to a first downlink control channel transmission, wherein the first downlink control channel transmission is from the base station to the relay node, an uplink control portion comprising at least one symbol having a first portion allocatable to a first uplink control channel transmission, wherein the first uplink control channel transmission is from the relay node to the base station, a data portion allocatable to one of one of uplink and downlink data transmission, wherein the data transmission is between the relay node and the base station, and wherein symbol timing of the subframe arrangement is different to the symbol timing of a subframe arrangement for use solely in wireless communications between a user equipment and at least one of the base station and a relay node.

The subframe arrangement is for use in wireless communications between a relay node and a base station and between a user equipment and at least one of the base station and relay node.

A method as defined by FIG. 10 may provide a design for self-backhauling based on the subframe formats defined for an access link. The method may be performed by the base station, which may comprise a donor eNB.

Elements of the proposed self-backhauling solution include one or more BH subframes (in addition to Access link subframe). A backhaul subframe may comprise a subframe arrangement, the arrangement comprising a plurality of symbols and a downlink control portion comprising at least one symbol having a first portion allocatable to a first downlink control channel transmission, wherein the first downlink control channel transmission is from the base station to the relay node, an uplink control portion comprising at least one symbol having a first portion allocatable to a first uplink control channel transmission, wherein the first uplink control channel transmission is from the relay node to the base station, a data portion allocatable to one of one of uplink and downlink data transmission, wherein the data transmission is between the relay node and the base station, and wherein symbol timing of the subframe arrangement is different to the symbol timing of a subframe arrangement for use solely in wireless communications between a user equipment and at least one of the base station and a relay node.

Alternatively, the data transmission may be between the user equipment and at least one of the relay node and the base station (e.g. access data).

The phrase "wireless communications" covers at least one of uni-directional communications with uni-directional control or uni-directional communications with bi-directional control.

The uplink control portion may comprise a second portion allocatable to a second uplink control channel transmission, wherein the second uplink control channel transmission is from the user equipment to one of the relay node and the base station.

The downlink control portion comprises a second portion allocatable to a second downlink control channel transmission, wherein the second downlink control channel transmission is from one of the relay node and the base station to the user equipment.

A backhaul subframe may be referred to as a subframe arrangement for use in wireless communications between a relay node and a base station and between a user equipment and at least one of the base station and relay node.

An access link subframe may be referred to as a subframe arrangement for use solely in wireless communications between a user equipment and at least one of the base station and a relay node That is, a BH subframe may contain an opportunity for data transmission, either UL or DL data and for both BH (transmission between a relay node and an eNB) and Access (transmission between the user equipment and one of the relay node and the base station).

A BH subframe may also include an opportunity for control channel transmission, in UL and DL and for both BH and Access.

In order to support simultaneous operation for access link and backhaul link (as discussed with reference to FIG. 8), BH usage is based on specific BH subframe type(s) (assuming neither BH control nor BH data is conveyed via access link subframes).

The BH subframe may be defined to be equal in length to the Access link subframe. A subframe may consist of M consecutive OFDMA symbols, where M is fixed for a given sub-carrier spacing. Exemplary design options for parameter M may include: M=7 and M=14. The actual subframe length may depend on the number of OFDMA symbols/subframe, CP length and the sub-carrier spacing. Sub-carrier spacing may vary according to numerology option selected. For example, sub-carrier spacing may be defined as N*15 kHz, where N is a scaling parameter (N may be e.g. 1, 2, 4, 8, . . . or ½, ¼, ⅛, . . . ).

Figure 11:
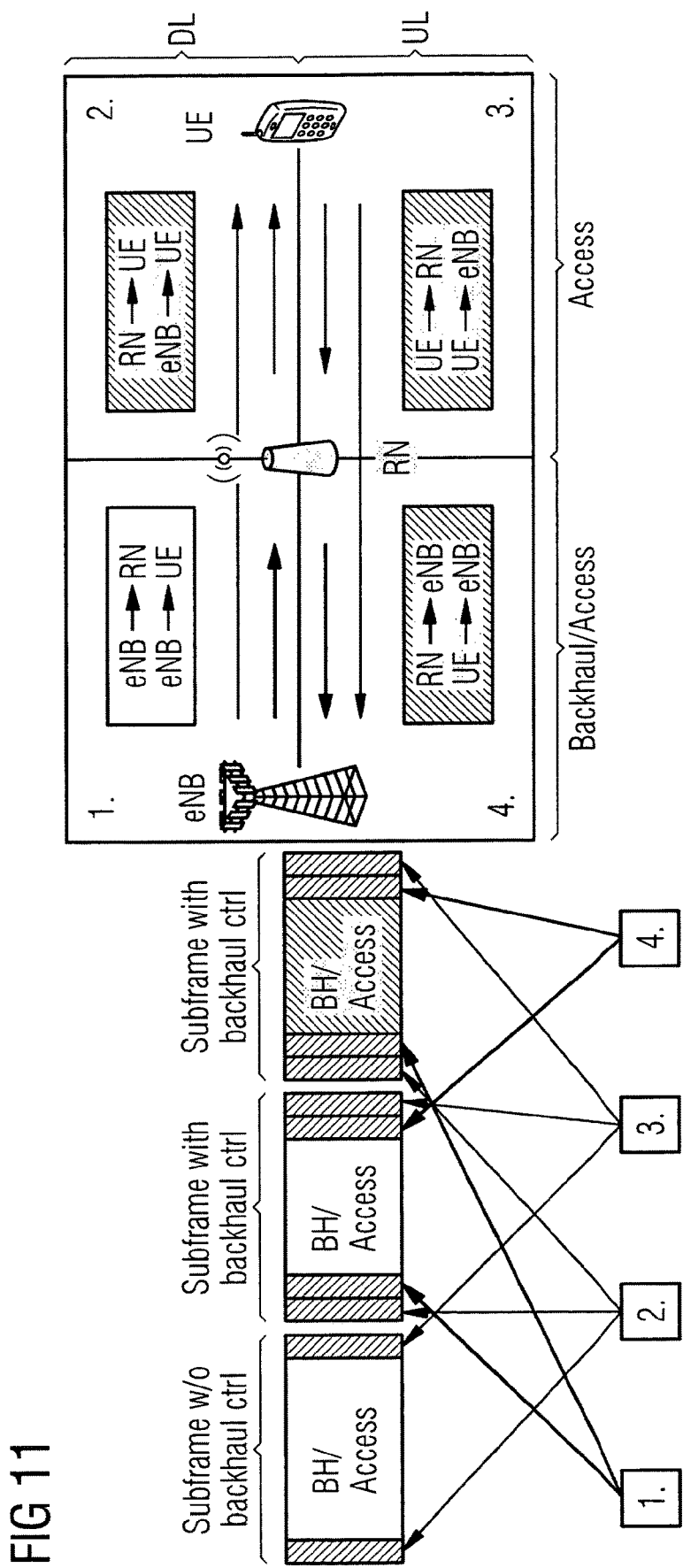
FIG. 11 shows partitioning of control and data portions of a subframe according to some embodiments.

FIG. 11 shows the content of an example BH subframe. The second portion of the downlink control portion may comprise a first portion of the DL control (which may be the $1^{st}$ OFDMA symbol denoted as #2). The second portion of the uplink control portion may comprise a last portion of the UL control (which may be the last OFDMA symbol denoted as #3) and serves the access link.

The first portion of the downlink control portion may comprise the second portion of the DL control (such as the 2nd OFDMA symbol denoted as #1) and be allocated to DL control of BH link. The first portion of the uplink control portion may comprise the second last portion of the UL control (such as the second last OFDMA symbol denoted as #4) and be allocated allocated to UL control of the BH link. The BH subframe may contain sufficient Guard period(s), not shown in FIG. 11, to facilitate up-to four link direction switching within subframe. The arrangement may comprise GPs between the first and second portions of the control portions. The GPs may cause the different symbol timing between BH subframe and access link subframe.

The data part in BH subframe is assigned for Backhaul and/or Access link based on eNB/RN scheduler decisions.

In one embodiment, Access link control plane (DL and/or UL control) may be maintained in the BH subframe types(s).

A Donor eNB is in charge of scheduling the backhaul link (and BH subframe types). The allocation of BH subframes may be either semi-static (i.e., configured by higher layer signalling), dynamic or a combination of semi-static and dynamic operation. In one embodiment, BH subframe are allocated with certain predetermined pattern (e.g. with a predefined periodicity & subframe offset). For example, every fifth of tenth subframe may be pre-allocated as BH subframes. Allocation may be based e.g. on the number of RNs connected to DeNB. It is possible to have also more than one consecutive BH subframes in repeating periodically. For example, two consecutive subframes may be pre-allocated as BH subframes with the periodicity of 10 subframes. DeNB may utilize BH subframes to allocate additional BH subframes, on the need basis, e.g. based on the instantaneous traffic needs on the BH link. These are allocated in dynamic manner.

A UE allocated to RN subframe knows the subframe type (i.e. whether the sub frame is an access or a BH subframe). Downlink control information (DCI), e.g. a physical downlink control channel, may comprise an indication of the subframe type (e.g. access or BH subframe). UE may be able to derive the subframe type (or at least differentiate access subframe and BH subframe) from Downlink control information, such as PDCCH. This may be the option for dynamically allocated BH subframes. Part of the subframes may be semi-statically allocated as BH subframes and UEs (as well as RNs) transmitting or receiving during these subframes may know in advance that these are BH subframes. The actual type of BH subframe (i.e. BH DL or BH UL or BH with UL control) may vary according to eNB scheduler decision and UEs (as well as RNs) may derive this info from Downlink control information. The default assumption for the subframe type for an UE can be access link subframe. It is also possible for UE to derive the subframe type (Access vs BH type) blindly based on DL measurement.

Measurement may involve two hypothesis, one with Access link subframe and another with BH subframe.

In the case of dynamic allocation of BH subframe, UE & RN determine subframe type from Downlink control information (conveyed via PDCCH). This may be determined from at least one of DL grant, UL grant and common grant. Explicit signalling indicating the subframe type (BH subframe vs. Access link subframe) may or may not involve scheduling delay. DeNB may allocate one or multiple (consecutive) BH subframes via single PDCCH.

A scheduling delay of k subframes (k may be e.g., 0, 1 or 2 subframe) may need to be introduced especially when allocating resources for BH downlink (UL scheduling may involve scheduling delay also for access link). This ensures that the RN has enough time to mute the RN access link (data part) in the case it is receiving BH DL.

To address the "chicken and egg" problem related to dynamically scheduled BH subframes, as described above, whereas the size of the first control portion may vary dynamically between different access link subframes, in the case of BH subframe, the first control portion (or in general, access link control) has a predetermined size (e.g. one OFMDA symbol).

Access link operation during BH subframe follows symbol timing defined for BH subframe (which is different from Access link subframe). When BH subframe is allocated, downlink control information (conveyed via PDCCH of the first control portion) may indicate the subframe type and the related symbol timing. By default, the UE may assume the subframe type to be Access link subframe. The UE may assume BH subframe type for certain subframe(s), only if indicated by explicit signalling (such as semi-static configuration or dynamic signalling).

Figure 12:
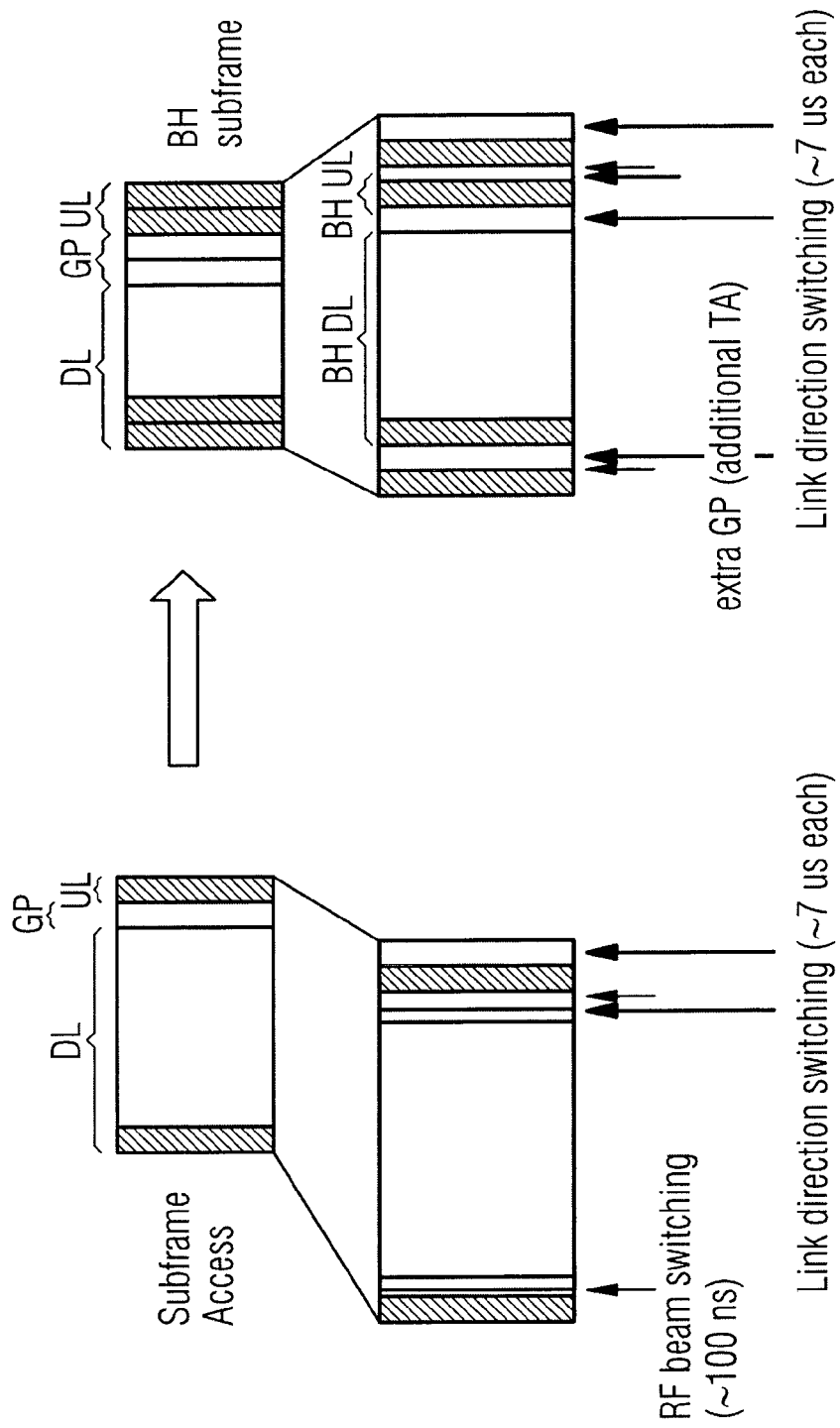
FIG. 12 shows a schematic illustration of the creation of a backhaul subframe from an access link subframe.

FIG. 12 shows how an example BH subframe type may be obtained from an Access link subframe. One (or more) symbols away from the data part of the access link subframe is punctured. One (or more) additional control symbols for DL and/or UL (for BH purposes) is added. The punctured symbol(s) are utilised as GP between access link control (i.e. the first control portion) and BH link control (i.e. the second control portion). For example, when the data portion comprises an uplink data portion there is no guard period between the uplink control portion and the data portion and when the data portion comprises a downlink data portion, there is no guard period between the uplink control portion and the data portion.

BH subframe types may be defined by the specification. Specification may define the available BH subframe types, including details related to the size of the first DL control portion (e.g. in terms of number of OFDMA symbols), the size of the second DL control portion, the size of the first UL control portion, the size of the second UL control portion and the size and location of (up-to) four GP portion(s). The size of each portion may vary between 0, . . . K symbols.

Each BH subframe type (and also subframe types defined for Access link operation) may be characterized by an information element (e.g. 3-5 bits). Selection of the BH/Access link subframe types may be indicated via this information element, and it may be included in UL/DL/Common grants.

As discussed, when eNB configures a BH subframe, the Access link UEs need to follow this configuration. This is needed in order to keep symbol timing aligned. Note that in the current example, data part is allocated to DL. In the case of UL (not shown), the $2^{nd}$ GP may be located before the data part.

It should be noted that in some scenarios, BH subframe may need to contain control signal just for one link direction (DL or UL). It is possible to define separate BH subframe types for these scenarios (e.g. BH subframe w/o BH UL control). The same applies to Access link control. For certain subframes, there may be no need e.g. for UL control corresponding to access link. Absence of certain control signalling types may mean that some GPs are redundant (Hence, they are not needed in the corresponding subframe type).

BH subframes may be used for access links in multipoint connection scenarios as well. One example is the operation in higher carrier frequencies (>6 GHz) where UEs may operate using hybrid transceiver architecture and with narrow RF beams. Assuming a UE with 2 RX chains connected to one x-pol antenna panel, the UE can form one RF beam at a time. In a multi-point scenario UE may be served from multiple non-co-located transmission points at a time for connection reliability and scheduling flexibility reasons. To be able to receive, e.g., PDCCH from different transmission points, the UE should be able to configure its RF beam to the direction potential PDCCH may be transmitted from. To support such multi-point PDCCH reception possibility for the UEs with RX beamforming, the eNB may configure a subframe type similar to that described with reference to FIGS. 11 and 12 with BH link capability for the UE(s). In this case semi-static configuration may be preferred.

The BH subframe defined above may minimise latency for self-backhauling, provide smooth coexistence with 5G frame structure, provide dynamic and fully flexible radio resource allocation between Backhaul and Access link, as well as between UL and DL, maximize access link usage also at the time when DeNB is serving BH link and reduce error cases due to different symbol timing & scalable control plane.

It should be understood that each block of the flowchart of the Figures and any combination thereof may be implemented by various means or their combinations, such as hardware, software, firmware, one or more processors and/or circuitry.

It is noted that whilst embodiments have been described in relation to one example of a 5G network, similar principles maybe applied in relation to other examples of new radio networks. It should be noted that other embodiments may be based on other cellular technology other than 5G or on variants of 5G. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

Figure 13:
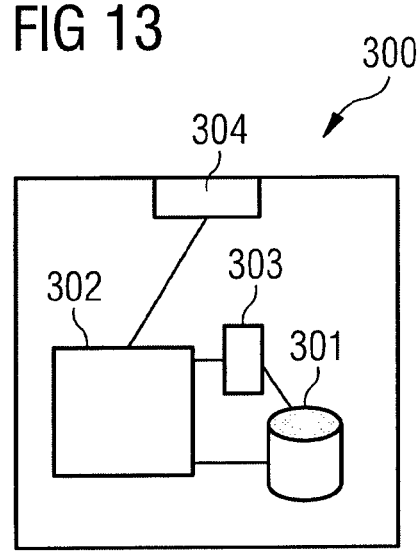
FIG. 13 shows a schematic diagram of an example control apparatus.

The method may be implemented in such as a control apparatus as shown in FIG. 13. The method may be implanted in a single processor 201 or control apparatus or across more than one processor or control apparatus. FIG. 13 shows an example of a control apparatus for a communication system, for example to be coupled to and/or for controlling a station of an access system, such as a RAN node, e.g. a base station, (e) node B, a central unit of a cloud architecture or a node of a core network such as an MME or S-GW, a scheduling entity such as a spectrum management entity, or a server or host. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 or processor 201 can be configured to execute an appropriate software code to provide the control functions. Control functions may comprise allocating resources for use by a subframe arrangement, the arrangement comprising a plurality of symbols and a downlink control portion comprising at least one symbol having a first portion allocatable to a first downlink control channel transmission, wherein the first downlink control channel transmission is from the base station to the relay node, an uplink control portion comprising at least one symbol having a first portion allocatable to a first uplink control channel transmission, wherein the first uplink control channel transmission is from the relay node to the base station, data portion allocatable to one of one of uplink and downlink data transmission, wherein the data transmission is between the relay node and the base station, and wherein symbol timing of the subframe arrangement is different to the symbol timing of a subframe arrangement for use solely in wireless communications between a user equipment and at least one of the base station and a relay node.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

In an embodiment at least some of the functionalities of the apparatus of FIG. 13 may be shared between two physically separate devices forming one operational entity. Therefore, the apparatus may be seen to depict the operational entity comprising one or more physically separate devices for executing at least some of the described processes. The apparatus utilizing such shared architecture, may comprise a remote control unit (RCU), such as a host computer or a server computer, operatively coupled (e.g. via a wireless or wired network) to a remote radio head (RRH) located in the base station. In an embodiment, at least some of the described processes may be performed by the RCU. In an embodiment, the execution of at least some of the described processes may be shared among the RRH and the RCU.

In an embodiment, the RCU may generate a virtual network through which the RCU communicates with the RRH. In general, virtual net-working may involve a process of combining hardware and software network resources and network functionality into a single, software-based administrative entity, a virtual network. Network virtualization may involve platform virtualization, often combined with resource virtualization. Network virtualization may be categorized as external virtual networking which combines many net-works, or parts of networks, into the server computer or the host computer (i.e. to the RCU). External network virtualization is targeted to optimized network sharing. Another category is internal virtual networking which provides net-work-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
    communicating, by a relay node via wireless communications, a backhaul subframe having a first subframe arrangement; and
    communicating, by the relay node via the wireless communications, an access subframe having a second subframe arrangement;
    wherein a first symbol timing of the first subframe arrangement is different than a second symbol timing of the second subframe arrangement used in the wireless communications; and wherein the first symbol timing of the first subframe arrangement for the backhaul subframe being different than the second symbol timing of the second subframe arrangement for the access subframe is achieved based on the following:
a guard period between first and second portions of an uplink control portion.

2. The method of claim 1, wherein the first symbol timing of the first subframe arrangement for the backhaul subframe being different than the second symbol timing of the second subframe arrangement for the access subframe is achieved based on:
a guard period between first and second portions of a downlink control portion.

3. The method according to claim 2, wherein the first subframe arrangement comprising:
a plurality of symbols:
the downlink control portion comprising at least one symbol having the first portion allocatable to a first downlink control channel transmission which is transmitted to the relay node;
the uplink control portion comprising at least one symbol having the first portion allocatable to a first uplink control channel transmission which is transmitted from the relay node; and
a data portion allocatable to one of uplink and downlink data transmission, wherein the one of uplink and downlink data transmission is performed by the relay node.

4. The method according to claim 3, wherein when the data portion comprises an uplink data portion, there is a guard portion between the downlink control portion and the data portion and no guard period between the uplink control portion and the data portion, and when the data portion comprises a downlink data portion, there is a guard period between the uplink control portion and the data portion and no guard period between the downlink control portion and the data portion.

5. The method according to claim 4, wherein the uplink control portion comprises the second portion allocatable to a second uplink control channel transmission which is transmitted to the relay node.

6. The method according to claim 4, wherein the downlink control portion comprises the second portion allocatable to a second downlink control channel transmission which is transmitted from the relay node.

7. The method according to claim 1, wherein a subframe type is determined from a physical downlink control channel, wherein the subframe type indicates either the first subframe arrangement of the backhaul subframe or the second subframe arrangement of the access subframe,
wherein the backhaul subframe is used for communication between at least one of a relay node and a base station or between a user equipment and at least one of the base station and relay node, and
wherein the access subframe is used for communication between the user equipment and at least one of the base station and the relay node.

8. The method according to claim 7, wherein the subframe type is indicated by an indication included in downlink control information.

9. The method according to claim 1, wherein a length of the first subframe arrangement is equal to a length of the second subframe arrangement used in the wireless communications.

10. A method comprising:
receiving, by a user equipment, information allocating resources for use by a second subframe arrangement; and
communicating, by the user equipment, via wireless communications, an access subframe having the second subframe arrangement;
wherein a first symbol timing of a first subframe arrangement is different than a second symbol timing of the second subframe arrangement used in the wireless communications;
wherein the first subframe arrangement is used for a backhaul subframe; and
wherein the first symbol timing of the first subframe arrangement for the backhaul subframe being different than the second symbol timing of the second subframe arrangement for the access subframe is achieved based on the following:
a guard period between first and second portions of an uplink control portion.

11. The method of claim 10, wherein the first symbol timing of the first subframe arrangement for the backhaul subframe being different than the second symbol timing of the second subframe arrangement for the access subframe is achieved based on:
a guard period between first and second portions of a downlink control portion.

12. The method according to claim 11, wherein the first subframe arrangement comprising:
a plurality of symbols:
the downlink control portion comprising at least one symbol having the first portion allocatable to a first downlink control channel transmission which is transmitted to the relay node;
the uplink control portion comprising at least one symbol having the first portion allocatable to a first uplink control channel transmission which is transmitted from the relay node; and
a data portion allocatable to one of uplink and downlink data transmission, wherein the one of uplink and downlink data transmission is performed by the relay node.

13. The method according to claim 12, wherein when the data portion comprises an uplink data portion, there is a guard portion between the downlink control portion and the data portion and no guard period between the uplink control portion and the data portion, and when the data portion comprises a downlink data portion, there is a guard period between the uplink control portion and the data portion and no guard period between the downlink control portion and the data portion.

14. The method according to claim 13, wherein the uplink control portion comprises the second portion allocatable to a second uplink control channel transmission, wherein the second uplink control channel transmission is from the user equipment to one of a relay node and a base station.

15. The method according to claim 13, wherein the downlink control portion comprises the second portion allocatable to a second downlink control channel transmission, wherein the second downlink control channel transmission is transmitted to the user equipment.

16. The method according to claim 13, wherein a subframe type is determined from a physical downlink control channel, wherein the subframe type indicates either the first subframe arrangement of the backhaul subframe or the second subframe arrangement of the access subframe,
wherein the backhaul subframe is used for communication between at least one of a relay node and a base station or between a user equipment and at least one of the base station and relay node, and wherein the access subframe is used for communication between the user equipment and at least one of the base station and the relay node.

17. An apparatus comprising:

at least one processor and at least one memory including a computer program code, the at least one memory and the computer program code configured to, with the at least one processor, cause the apparatus at least to:

receive information allocating resources for use by a second subframe arrangement; and communicate via wireless communications, an access subframe having the second subframe arrangement;

wherein a first symbol timing of a first subframe arrangement is different than a second symbol timing of the second subframe arrangement used in wireless communications;

wherein the first subframe arrangement is used for a backhaul subframe; and wherein the first symbol timing of the first subframe arrangement for the backhaul subframe being different than the second symbol timing of the second subframe arrangement for the access subframe is achieved based on the following:

a guard period between first and second portions of an uplink control portion.

18. The apparatus of claim 17, wherein the first symbol timing of the first subframe arrangement for the backhaul subframe being different than the second symbol timing of the second subframe arrangement for the access subframe is achieved based on:

a guard period between first and second portions of a downlink control portion.

19. The apparatus according to claim 18, wherein the first subframe arrangement comprising:

a plurality of symbols:

the downlink control portion comprising at least one symbol having the first portion allocatable to a first downlink control channel transmission which is transmitted to the relay node;

the uplink control portion comprising at least one symbol having the first portion allocatable to a first uplink control channel transmission which is transmitted from the relay node; and a data portion allocatable to one of uplink and downlink data transmission, wherein the one of uplink and downlink data transmission is performed by the relay node, and wherein when the data portion comprises an uplink data portion, there is a guard portion between the downlink control portion and the data portion and no guard period between the uplink control portion and the data portion, and when the data portion comprises a downlink data portion, there is a guard period between the uplink control portion and the data portion and no guard period between the downlink control portion and the data portion.

* * * * *